3,482,257
SINGLE UNIT RECORDER INKING SYSTEM
Hoel L. Bowditch, and Christian Frederick Johnsen, Foxboro, Mass., assignors to The Foxboro Company, Foxboro, Mass., a corporation of Massachusetts
Filed May 2, 1968, Ser. No. 726,002
Int. Cl. G01d 15/16
U.S. Cl. 346—140                                    5 Claims

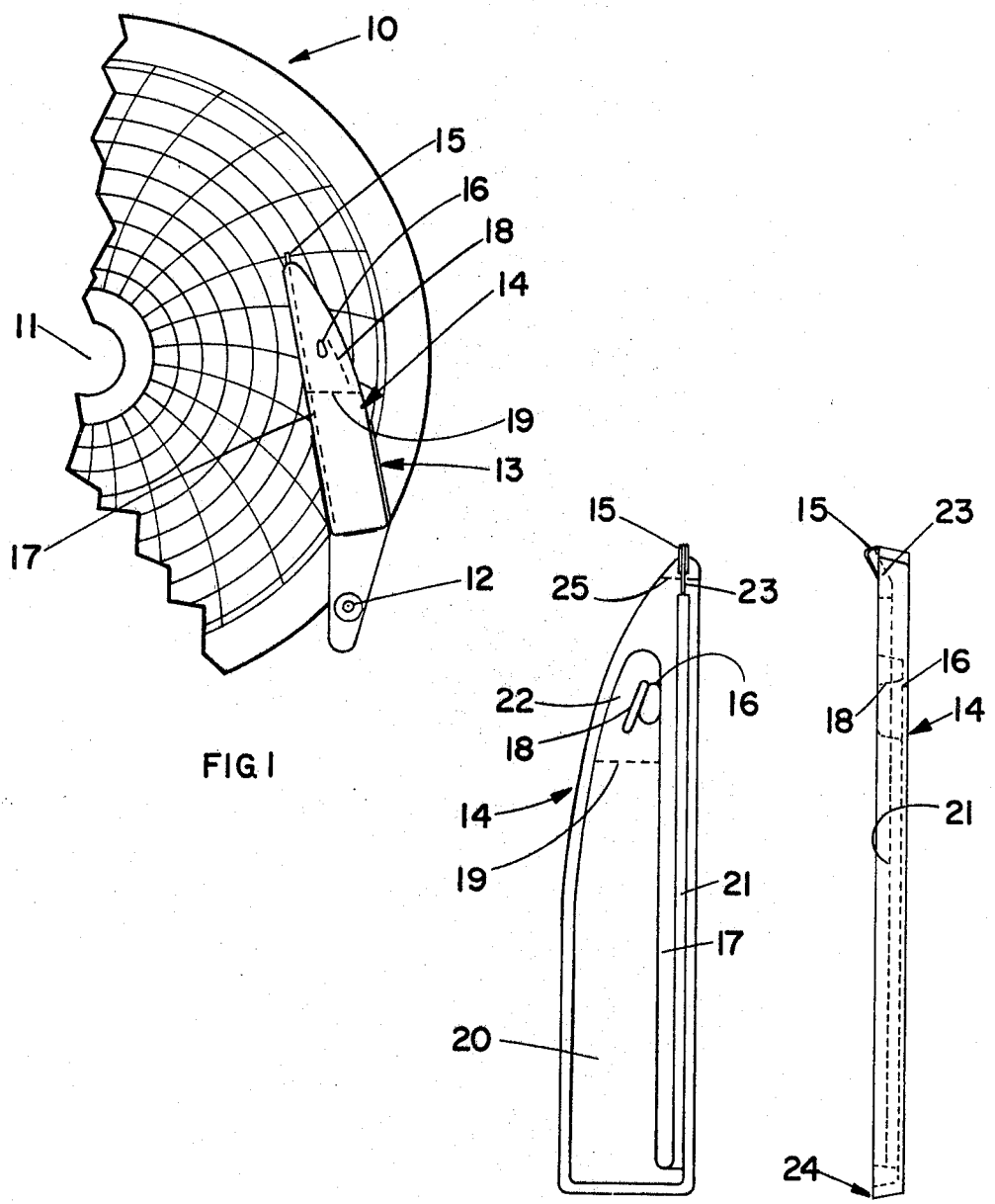

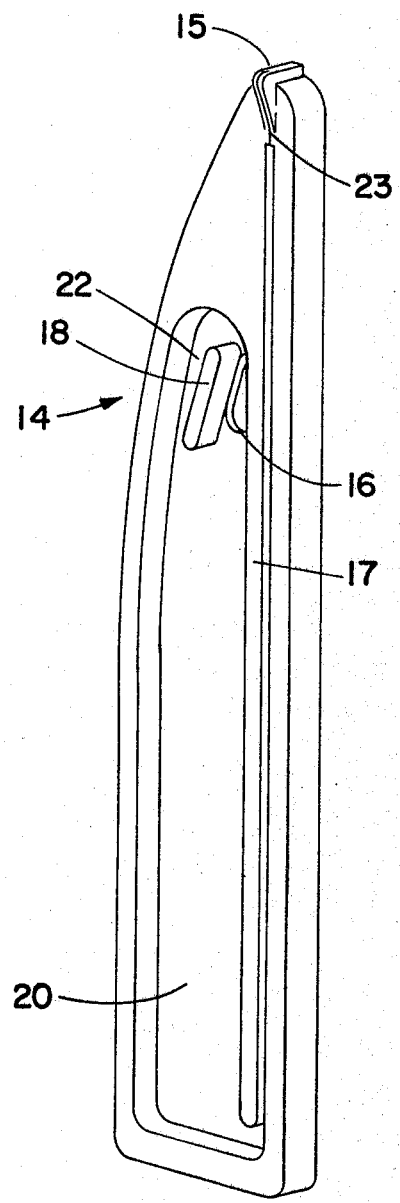
FIG. 4
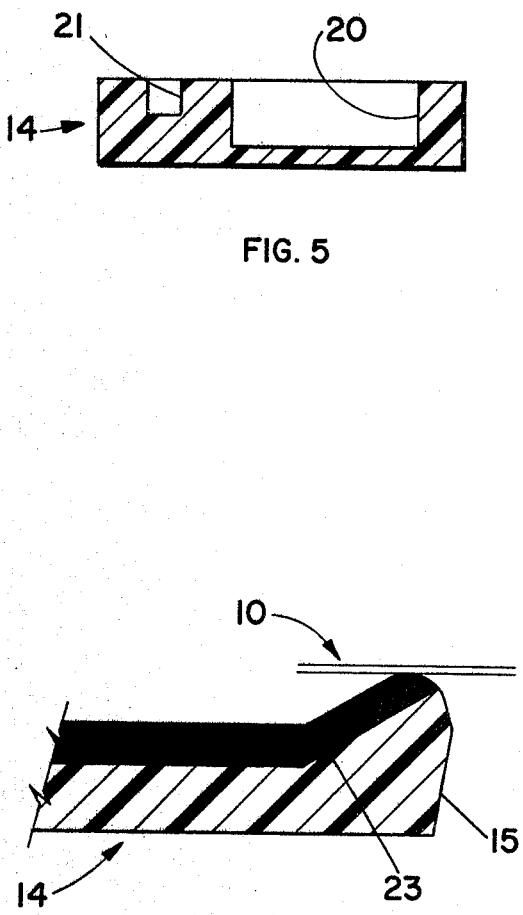
FIG. 5
FIG. 6
INVENTOR.
HOEL L. BOWDITCH
CHRISTIAN FREDERICK JOHNSEN
BY
Lawrence H. Poston
AGENT Dec. 2, 1969     H. L. BOWDITCH ET AL     3,482,257
SINGLE UNIT RECORDER INKING SYSTEM
Filed May 2, 1968                          3 Sheets-Sheet 3
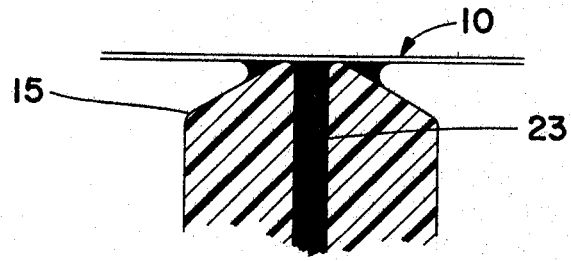
FIG. 7
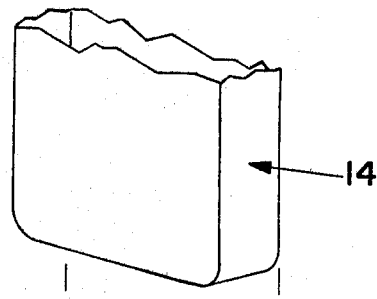
FIG. 8
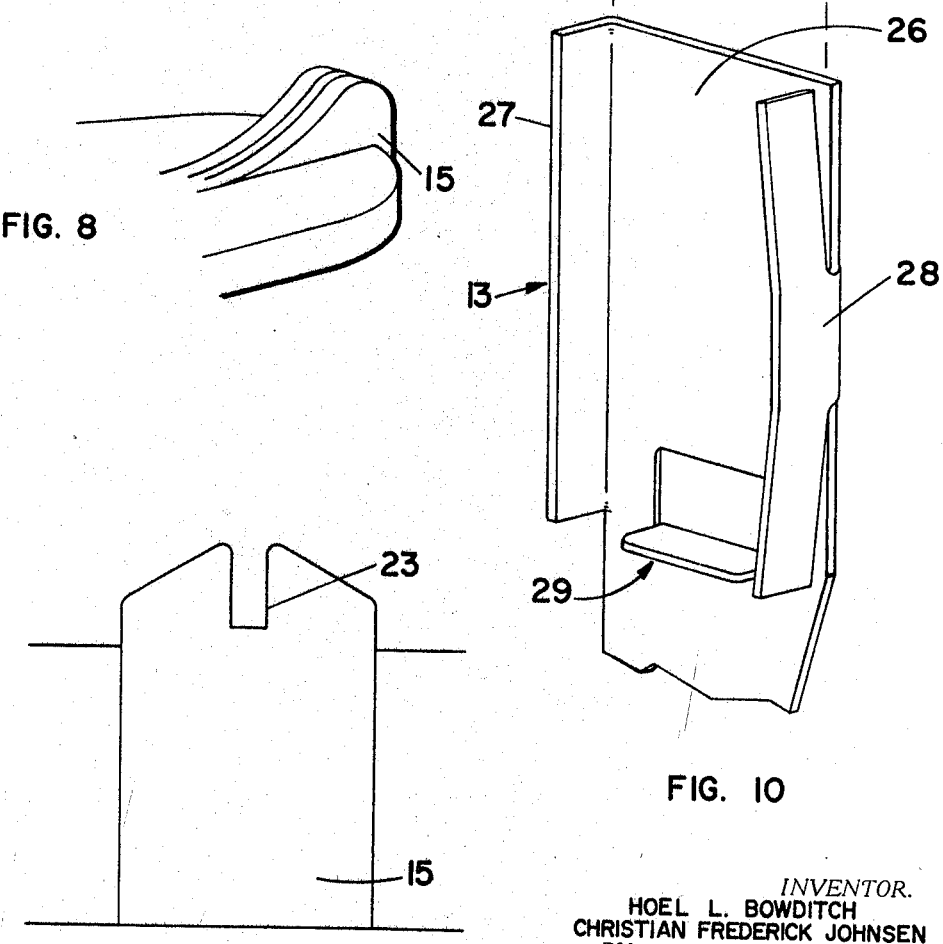
FIG. 9
FIG. 10
INVENTOR.
HOEL L. BOWDITCH
CHRISTIAN FREDERICK JOHNSEN
BY
Lawrence H. Poston
AGENT ent Office 3,482,257
Patented Dec. 2, 1969

ABSTRACT OF THE DISCLOSURE

An inking system for recording the values of industrial process parameters in which the system includes a self-contained single unit comprising ink supply, recording nib, and delivery conduit from the supply to the nib. The unit is thin, for use in limited space, is provided with means for refilling without dismounting, and is formed of a recessed body covered by an adhesive tape.

---

This invention relates to industrial process systems and to means for providing a record of the value of parameters of such processes. It particularly relates to inking systems for accomplishing such records, usually by applying ink to a moving chart to form markings on the chart with respect to time and value indications on the chart and with movement transversely of the movement of the chart, in representation of changes in the values of such parameters.

Inking systems of this nature require some form of ink supply, a pen nib through which the ink is applied to the chart, and a passage connection from the ink supply to the pen nib.

Many prior inking systems provided fixed ink supply containers, long and delicate passage therefrom, and precise and delicate pen nibs, in a combination of separate units, with problems of joining and operating together.

This invention provides an integral, single unit inking system wherein ink supply, passage, nib and pointer are all in one body, the body being a pointer in itself, all movable together in a simple, useful unit system.

The inking system according to this invention lends itself to use in limited space applications, to simple and easy replacement and/or refilling, and is a simple form of recessed body covered with a form of adhesive tape to form one somewhat flexible wall over the recesses of the body, with an opening in the body which is combined air vent and ink entrance.

This invention thus includes an inking package which is quickly and easily mounted or dismounted in or from a snap-in holder which in turn is fixed to a member such as an arbor movable in response to changes in process parameter value changes.

The inking system of this invention lends itself to simple and clean ink filling and refilling, and this may readily be accomplished at the factory or distributorship, or in the field. It may be readily accomplished without removal from it's operating holder. With suitable enclosures and sealing, complete inking systems may thus be shipped, or stocked, and can be used as inexpensive throw-away units in situations where refilling is not necessarily a desirable maintenance procedure.

This invention provides useful and unique features such as a unitary recessed molded plastic essentially rigid body wherein an ink chamber is one recess, and baffles are used to provide air vent and ink-to-nib passages, these recesses being covered with a wall of adhesive tape as one side of the body. The entire body, including the pen nib is a single plastic moulding wherein capillary restriction is formed in and near the pen nib as part of the ink delivery passage, to draw ink from the ink supply for application to the recorded chart from the pen nib.

This invention is useful in general application, but also lends itself to use in trend recording techniques, wherein spot check or short run records are made to determine the current direction or trend of the value of a process parameter, and as such, may be used as an approximation record, with inexpensive and rough gauge structure, assembly and operation.

This inking system may be of the order of 3/32 inch thick, 2 1/8" long, and less than 1/2 inch wide.

Other objects and advantages of this invention will be in part apparent and in part pointed out hereinafter and in the accompanying drawings, wherein:

FIGURE 1 illustrates an inking system according to this invention, in relation to a recording chart;

FIGURE 2 is a view of the inking body according to this invention, from the under (chart) side thereof, without the under side adhesive tape cover;

FIGURE 3 is a side edge view of the structure of FIGURE 2;

FIGURE 4 is a perspective of the structure of FIGURE 2, in further illustration thereof;

FIGURE 5 is a cross-section of the structure of FIGURE 2, taken on line 5—5 of FIGURE 2;

FIGURE 6 is a partial lengthwise central section of the pen nib of FIGURES 2 and 4, showing the form of the body of ink flowed to the pen nib;

FIGURE 7 is an enlarged view of the relation between the pen nib and the recording chart;

FIGURE 8 is a perspective of the pen nib itself;

FIGURE 9 is a view of the outer end face of the pen nib; and

FIGURE 10 is an eploded view, in fragment, of the inking body and its holder.

Throughout the drawings, the same structure is shown in different aspects. Accordingly, like reference numbers are applied to like elements throughout.

In FIGURE 1 a recording chart 10 is mounted for counterclockwise rotation about an arbor 11, which may be driven electrically, or suitably otherwise, and which may be stopped, started, or driven at different speeds. This provides for full time recording, of for spot check or trend test runs, as desired. (Driving and switching means not shown).

The inking system is driven by an arbor 12 which is rotatable by suitable means (not shown) in response to and in representation of the value changes of a selected parameter such as flow, pressure, temperature or the like, or a combination of these of an industrial process. The arbor 12 may be driven, for example, from a connection to an indicator (not shown) of such a process parameter.

Fixed to the arbor 12 and extending generally vertically up therefrom, is an inking body holder 13. As shown, this may be angled to provide a particular location or position with respect to the chart 10 and its movement, as desired. The inking system may be kept permanently operatively connected through the arbor 12.

An inking body 14 is removably mounted in the holder 13, and is shown with a pen nib 15, an ink filling and air vent hole 16, and internal baffles 17 and 18 for defining ink delivery and air passages respectively. An indication of a normal full ink level is indicated at 19.

The inking body 14 is shown in more detail in FIGURES 2, 3, and 4. The body 14 is recessed to provide an ink supply chamber 20, and the baffles 17 and 18 define recess ink delivery passage 21 and air vent passage 22. The baffle 18 lies along the long side of the air and ink oval opening 16, from slightly above the top of the oval to well below the bottom of the oval. Thus, even when the ink chamber is being filled with ink, usually by inserting an ink dispenser tube in through the opening 16, air is still free to vent up the other side of the baffle 18 and out through the top of the opening 16.

The baffle 17 extends from above the opening 16 down to a point near the bottom of the ink chamber 20. Thus the ink delivery passage 21 starts from the bottom of the ink supply, the full length of the inking system body, terminating in a capillary passage 23 leading into and through the pen nib 15.

FIGURE 1 looks at the top of the inking body. FIGURES 2 and 4 look at the bottom of the inking body. Thus the recesses of the inking body are open toward the chart, but that whole underside is covered by an adhesive tape as partially indicated in FIGURE 3 at 24. This tape cover extends the full length of the inking body, except for the nib portion. The top end of the tape and a fragment thereof, is shown in FIGURE 2 at 25.

FIGURE 5 shows in cross-section of the inking body 14 that the ink delivery passage 21 is about half the depth of the ink chamber 20.

Details of the pen nib and the capillary end 23 of the ink delivery passage 21 and the relation of the pen nib to the chart are shown in FIGURES 6, 7, 8 and 9.

In FIGURE 6 a central lengthwise section of the inking nib is shown, with the tangential contact with the chart 10 indicated by placement of a fragment of the chart 10 against the nib. Ink is shown in the capillary 23 to indicate the angled capillary towards the chart and to illustrate the form of the body of ink directly related to the chart in the nib at the point of actual inking. One way of considering this is to point out that a vertical walled slice of what generally is a truncated cone is the form of ink body just over the chart contact point. In both FIGURES 6, 8 and 9 the nib is viewed under-side up, or chart contact side up. The depth of the capillary is the same as that of the ink delivery passage 21, but the capillary is much narrower, see FIGURE 2.

FIGURE 8 illustrates the outside form of the nib 15. FIGURE 9 looks at the outer end of the nib 15 to show that the capillary 23 extends lengthwise through the nib, and as seen in FIGURE 6, beyond the chart contact point, on a curved basis to provide the tangential chart contact.

FIGURE 7 is an enlarged transverse section of the pen nib 15, shown in relation to the chart 10, with the fallaway form of the nib providing some capillary space between the chart and the nib, in aid of the capillary 23 as a means of drawing ink from the ink supply chamber through the ink delivery passage.

FIGURE 10 illustrates the pen holder 13 with a back plate 26, one rigid side plate 27, a flexible tab side plate 28, and a bottom end rest bracket 29. The inking body 14 is mounted by sliding it between the side plates 27 and 28 until it rests against the bracket 29, and pressing it firmly against the back plate 26.

After the inking body is filled with ink, the inking system may be started up by gently blowing into the opening 16, FIGURE 1, or by gently squeezing the cover of adhesive tape, or both. Such pressures force ink through the ink delivery passage 21 into and through the capillary 23.

The ink supply body and weight is over, adjacent, and downward with respect to the drive arbor 12.

This invention accordingly provides a new and useful inking system for industrial process recording.

As many embodiments may be made of the above invention, and as changes may be made in the embodiment set forth above without departing from the scope of the invention, it is to be understood that all matters hereinbefore set forth and in the accompanying drawings is to be interpreted as illustrative only and not in a limiting sense.

We claim:

1. For use in an industrial process operational system, for the purpose of recording the value of a parameter of said process, and as a part of a recording system with which to accomplish said purpose by applying ink on a moving chart,
   an integral single unit inking system comprising
   a combination of an ink supply chamber, a pen nib for applying ink to said chart, and an ink conduit from said ink supply chamber to said pen nib,
   said combination being mounted for relative movement as a single unit with respect to said chart, to record the value of said process parameter, and
   said combination being in the form of a body recessed to define said chamber and said conduit, for receiving and adhesive tape cover to operatively enclose said chamber and said conduit.

2. For use in an industrial process operational system, for the purpose of recording the value of a parameter of said process, and as a part of a recording system with which to accomplish said purpose by applying ink on a moving chart,
   an integral single unit inking system comprising
   a combination of an ink supply chamber, a pen nib for applying ink to said chart, and an ink conduit from said ink supply chamber to said pen nib,
   said combination being mounted for relative movement as a single unit with respect to said chart, to record the value of said process parameter, and
   said system comprising a main body containing said chamber and said conduit open to one side of said body, and a cover over said one side to operatively enclose said chamber and said conduit,
   an opening in said body which serves both as an ink replenishment entrance and an air vent, and a baffle forming an air passage to and from said air vent opening without interference with ink in said body or being supplied thereto through said opening.

3. An inking system according to claim 2 wherein a second baffle is provided to form said ink conduit from said ink supply chamber to said pen nib, and wherein said ink conduit is provided with a reduced portion to and in the pen nib as a capillary to draw ink from said ink supply chamber to said pen nib.

4. An inking system according to claim 2 wherein a second baffle is provided to form said ink conduit from said ink supply chamber to said pen nib.

5. An industrial process recorder system comprising an arbor responsive in rotation to changes in the value of a process variable, a snap-in holder secured to said arbor for movement therewith, and inking assembly for assembly in said holder, said assembly comprising a single unit comprising an ink chamber, a pen nib, and ink conduit from said chamber to said pen nib, a capillary form in said conduit, and an opening in said chamber for ink replenishment and as an air vent said system having one baffle provided to form an air passage to said opening, and another baffle provided to define said ink conduit, said inking assembly comprising an open-sided body recessed to form said ink chamber, said baffles, and said air and ink passages, and an adhesive tape cover over said open side of said body to enclose said recesses.

References Cited

UNITED STATES PATENTS

| | | | |
|---|---|---|---|
| 1,573,339 | 2/1926 | Watts | 346—140 |
| 3,278,942 | 10/1966 | Bowditch | 346—140 |

FOREIGN PATENTS 29,209 of 1910 10/1911 Great Britain.

JOSEPH W. HARTARY, Primary Examiner